United States Patent
Kumagai

(10) Patent No.: US 7,977,890 B2
(45) Date of Patent: Jul. 12, 2011

(54) DIRECT CURRENT POWER SUPPLY DEVICE, POWER SUPPLY DEVICE FOR DRIVING LED AND SEMICONDUCTOR INTEGRATED CIRCUIT FOR CONTROLLING POWER SUPPLY

(75) Inventor: Keizo Kumagai, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 355 days.

(21) Appl. No.: 12/348,963

(22) Filed: Jan. 6, 2009

(65) Prior Publication Data

US 2009/0174340 A1    Jul. 9, 2009

(30) Foreign Application Priority Data

Jan. 8, 2008   (JP) .................... 2008-001352

(51) Int. Cl.
*H05B 41/16*   (2006.01)
(52) U.S. Cl. .............. 315/247; 315/185 S; 315/307; 315/224; 315/312

(58) Field of Classification Search ............. 315/247, 315/224, 246, 225, 185 S, 291, 297, 307–326
See application file for complete search history.

(56) References Cited

FOREIGN PATENT DOCUMENTS
JP   2003-152224 A   5/2003

*Primary Examiner* — Tuyet Thi Vo
(74) *Attorney, Agent, or Firm* — Holtz, Holtz, Goodman & Chick, PC

(57) ABSTRACT

Disclosed is a direct-current power supply device, including: an inductor; a switching element to intermittently supply a current to the inductor; an external terminal to which an output current of an external unit is fed back; a control circuit to generate a pulse signal having a pulse width corresponding to an output voltage of the external terminal, generate a drive signal for driving the switching element in response to the pulse signal, and output the drive signal to the switching element; a variable current source which is connected to the external terminal and which is turned on and off in response to a shutdown signal; and a discharge unit which is connected between the external terminal and a ground point and which is turned on in response to the shutdown signal so that the output current fed back to the external terminal is discharged into the ground point.

7 Claims, 6 Drawing Sheets

DIRECT CURRENT POWER SUPPLY DEVICE, POWER SUPPLY DEVICE FOR DRIVING LED AND SEMICONDUCTOR INTEGRATED CIRCUIT FOR CONTROLLING POWER SUPPLY

BACKGROUND OF THE INVENTION

1. Field of the Invention

The present invention relates to a direct-current power supply device that generates a power supply voltage for driving an LED, and more particularly to an effective technique utilized for a switching power supply device that generates a power supply voltage for driving a WLED (white light emitting diode), which is used for a backlight of a liquid crystal display monitor of a mobile device such as a portable phone, and for a semiconductor integrated circuit constituting the switching power supply device for controlling power supply.

2. Description of Related Art

WLED is used as a backlight of a liquid crystal display panel of a mobile device such as a portable phone. A DC-DC converter including a boost switching regulator is commonly used in a power supply device that generates a power supply voltage for driving the WLED. Feedback control is performed in such a power supply device for driving an LED. In the feedback control, an LED drive current is converted into a voltage to feed back the voltage to a control circuit, the voltage is compared with a reference voltage by an error amplifier to generate a drive pulse having a pulse width corresponding to the voltage potential difference, and a switching element intermittently supplying a current to an inductor (coil) is driven in response to the drive pulse to keep the drive current constant. Such a power supply device for driving an LED is disclosed in Japanese Patent Application Laid-Open No. 2003-152224, for example.

When turning off the direct-current power supply device that generates a power supply voltage for driving an LED, simply cutting off the power supply voltage of a control circuit (control IC), which controls the switching element, results in floating of nodes in the circuit, which may cause an undesirable operation of the circuit. In order to avoid this disadvantage, a terminal into which a shutdown signal SHDN is fed from the outside is commonly provided in the control IC, as shown in FIG. 1. When the shutdown signal SHDN becomes a high level or low level, an constant current source of an internal circuit, such as an error amplifier 12, an oscillation circuit, and a PWM (pulse width modulation) comparator 13, is turned off or a pull-down switch is turned on so as not to cause the floating of nodes in the circuit.

SUMMARY OF THE INVENTION

There has been a demand for a function of changing brightness of a backlight of a liquid crystal display panel in stages in a mobile device. The inventor has developed and studied a power supply device for driving an LED (hereinafter referred to as "LED driving power supply device") capable of changing brightness, that is, a drive current. FIG. 2 shows a configuration of this LED driving power supply device. The LED driving power supply device includes a terminal FB to which a current flowing through an LED is fed back, and a variable current source 11 into which the current is led and which connected to the terminal FB. The variable current source 11 includes a constant current source CS1. The current of the variable current source 11 is controlled by a control code CC so as to change a drive current for driving the LED, and the constant current source CS1 in the variable current source 11 can be turned off by a shutdown signal SHDN, thereby cutting off the current of the variable current source 11.

Unfortunately, turning off the constant current source CS1 in the LED driving power supply device of FIG. 2 leads to an open state between the feedback terminal FB and a ground point, and thereby rising a potential at the feedback terminal FB to an output voltage, which may break internal elements of the control circuit In order to avoid this disadvantage, the internal elements connected to the feedback terminal FB may be replaced with high-voltage elements. Such a change, however, needs a larger area and a complicated process, which may lead to high production costs.

It is, therefore, a main object of the present invention to provide a power supply device and a semiconductor integrated circuit for controlling power supply, both of which prevent the internal elements from being broken because of high-voltage feedback.

According to a first aspect of the present invention, there is provided a direct-current power supply device, including: an inductor; a switching element to intermittently supply a current to the inductor; an external terminal to which an output current of an external unit is fed back; a control circuit to generate a pulse signal having a pulse width corresponding to an output voltage of the external terminal, generate a drive signal for driving the switching element in response to the pulse signal, and output the drive signal to the switching element; a variable current source which is connected to the external terminal and which is turned on and off in response to a shutdown signal; and a discharge unit which is connected between the external terminal and a ground point and which is turned on in response to the shutdown signal so that the output current fed back to the external terminal is discharged into the ground point.

According to a second aspect of the present invention, there is provided a power supply device for driving an LED unit by supplying a drive current to the LED unit, the power supply device, including: an inductor; a switching element to intermittently supply a current to the inductor; an output terminal which is connected to the LED unit and through which the drive current is supplied to the LED unit; a rectifying element connected between the inductor and the output terminal; an external terminal to which an output current of the LED unit is fed back; a control signal generating circuit to generate a pulse signal having a pulse width corresponding to an output voltage of the external terminal; a drive circuit to generate a drive signal for driving the switching element in response to the pulse signal generated by the control signal generating circuit and output the drive signal to the switching element; a variable current source which is connected to the external terminal and which is turned on and off in response to a shutdown signal; and a discharge unit which is connected between the external terminal and a ground point and which is turned on in response to the shutdown signal so that the output current of the LED unit is discharged into the ground point.

According to a third aspect of the present invention, there is provided a semiconductor integrated circuit for controlling power supply, including: an external terminal to which an output current of an external unit is fed back; a control signal generating circuit to generate a pulse signal having a pulse width corresponding to an output voltage of the external terminal; a drive circuit to generate a drive signal for driving a switching element which intermittently supplies a current to an inductor, in response to the pulse signal generated by the control signal generating circuit, and output the drive signal to the switching element; a variable current source which is connected to the external terminal and which is turned on and off in response to a shutdown signal; and a discharge unit which is connected between the external terminal and a ground point and which is turned on in response to the shutdown signal so that the output current of the external unit is discharged into the ground point, wherein the variable current source includes: a constant current source which is turned on and off in response to the shutdown signal; a current-voltage conversion transistor connected in series with the constant current source; n first transistors (n is a positive integer) connected to the current-voltage conversion transistor in a current mirror manner; and n second transistors which is connected in series with the respective n first transistors between the external terminal and the ground point and to which n bit signals are applied as current control signals so that the n second transistors are turned on and off in response to the respective bit signals.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Preferred embodiments of the present invention will be described below with reference to the drawings.

Figure 1:
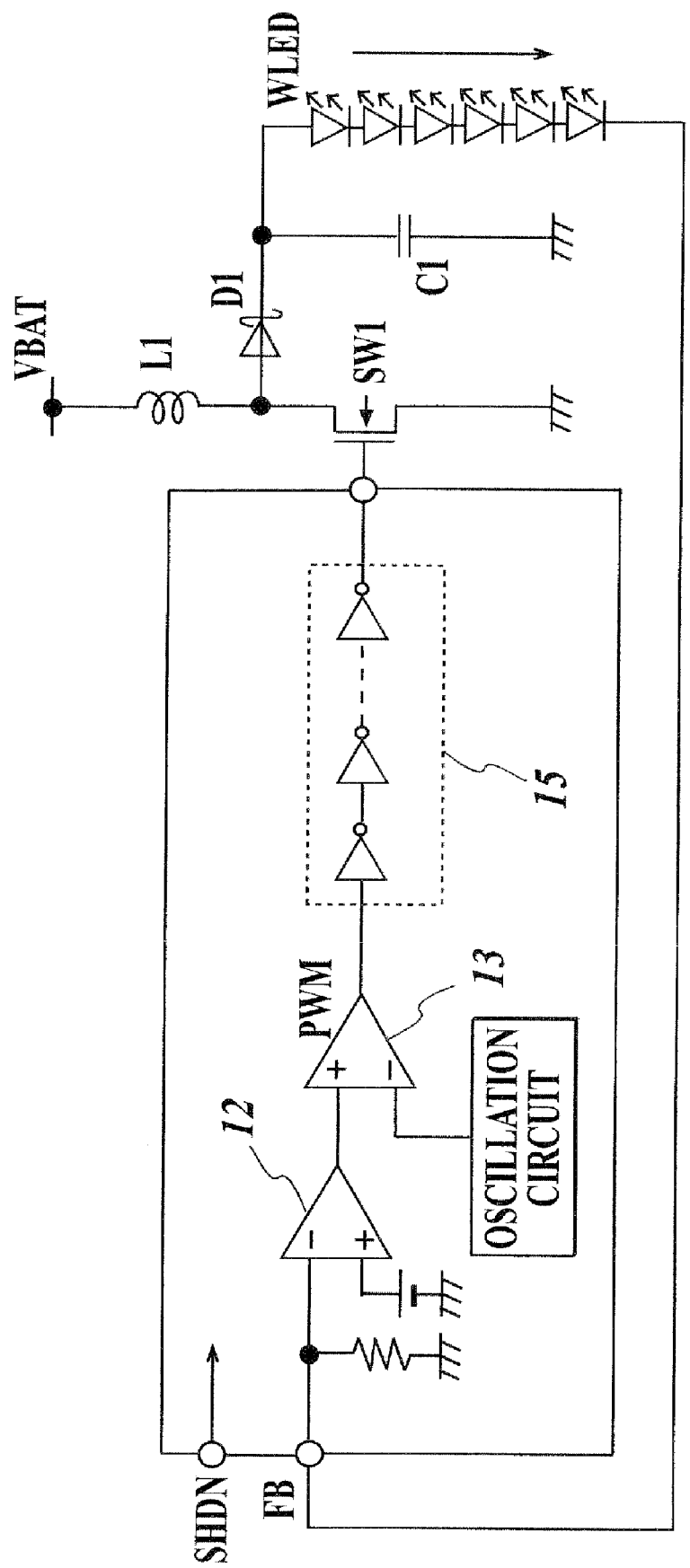
FIG. 1 shows a block diagram of a conventional power supply device for driving an LED.
Figure 2:
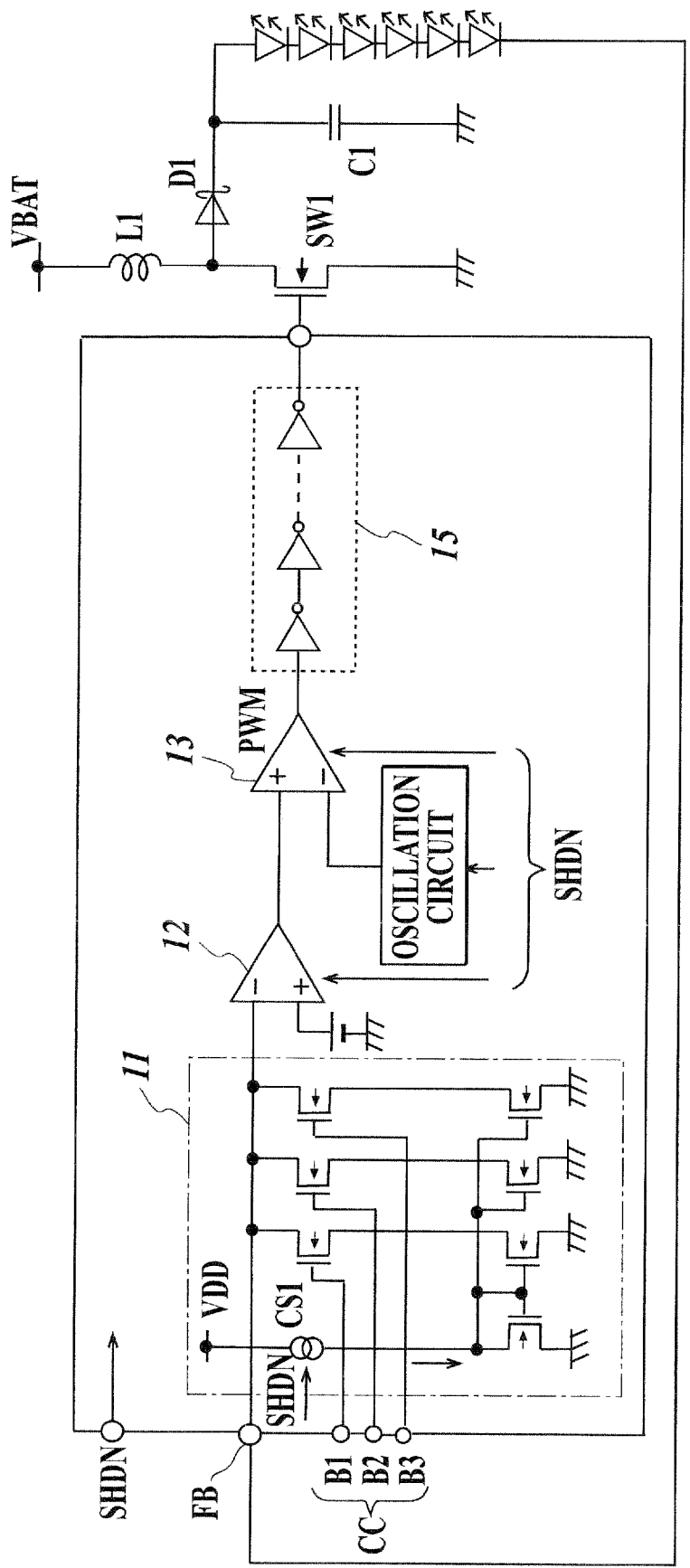
FIG. 2 shows a block diagram of a power supply device for driving an LED that the inventor has developed as a preliminary study.
Figure 3:
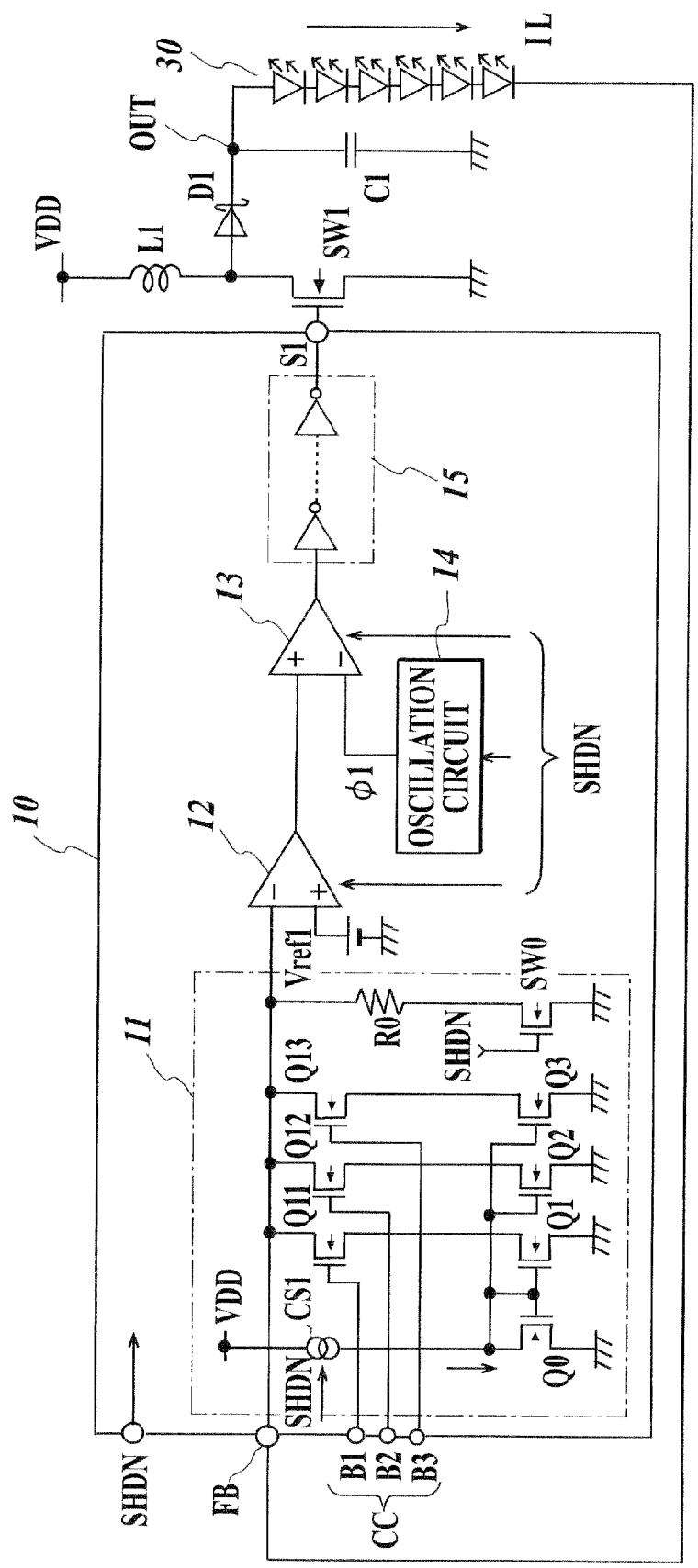
FIG. 3 shows a block diagram of a power supply device for driving an LED according to a first embodiment of the present invention.

FIG. 3 shows a power supply device for driving an LED (hereinafter referred to as "LED driving power supply device") according to a first embodiment of the present invention.

The LED driving power supply device of the first embodiment is configured as a boost switching regulator. The LED driving power supply device includes a coil (inductor) L1 and a switching transistor SW1 having an N-channel MOSFET (insulated gate field effect transistor), both of which are connected in series between a direct-current voltage terminal VDD and a ground point. The LED driving power supply device also includes: an output terminal OUT; a diode D1 connected between the output terminal OUT and a connection node between the coil L1 and the switching transistor SW1; a smoothing capacitor C1 connected between the output terminal OUT and the ground point; and a switching control circuit 10 that performs on-off control of the switching transistor SW1. An LED unit 30 is connected to the output terminal OUT. The TED unit 30 includes a plurality of white light emitting diodes WLED which are connected in series.

In the first embodiment, the switching control circuit 10 is configured as a semiconductor integrated circuit (hereinafter referred to as "power supply control IC") formed on one semiconductor chip, and each of the switching transistor SW1, the coil L1, the diode D1, and the smoothing capacitor C1 is configured as a discrete component and connected to the power supply control IC as an external element. The configuration of the LED driving power supply device is not limited to the embodiment shown.

The power supply control IC is provided with a feedback terminal FB to which a cathode terminal of the light emitting diodes WLED is connected A variable current source 11 is provided in the power supply control IC and connected to the feedback terminal FB so that a current passed through the light emitting diodes WLED can flow through the variable current source 11 in the power supply control IC. The power supply control IC is provided with terminals to which three bit signals B1 to B3 of a current control code CC are input from an external CPU. The variable current source 11 is configured to carry a current depending on the current control code CC (current command value) fed into the terminals. The current control code CC is not limited to three bits, but any bit can be used.

The switching control circuit 10 includes an error amplifier 12, a PWM comparator 13, and a drive circuit 15. An inverting input terminal of the error amplifier 12 is connected to the feedback terminal FB, and the error amplifier 12 compares a voltage of the feedback terminal FB with a reference voltage Vref1 and outputs a voltage corresponding to a difference between the voltage of the feedback terminal FB and the reference voltage Vref1. The output of the error amplifier 12 is fed into a non-inverting input terminal of the PWM comparator 13. The drive circuit 15 generates a drive signal for driving the switching transistor SW1 on and off according to the output of the PWM comparator 13.

A triangle wave is fed into an inverting input terminal of the PWM comparator 13 from an oscillation circuit 14 that generates a waveform signal φ1 having a predetermined frequency, The PWM comparator 13 generates a pulse signal having a pulse width corresponding to voltage of the feedback terminal FB (feedback voltage). Specifically, the pulse width is narrowed in the case of the high feedback voltage while the pulse width is widened in the case of the low feedback voltage. The pulse signal generated by the PWM comparator 13 is supplied to the drive circuit 15.

The variable current source 11 includes a constant current source CS1, a current-voltage conversion MOSFET Q0 connected in series with the constant current source CS1, three MOSFETs Q1, Q2 and Q3 that are connected to the MOSFET Q0 in a current mirror manner, and three switch MOSFETs Q11, Q12 and Q13 that are respectively connected in series with the MOSFETs Q1, Q2 and Q3 between the feedback terminal FB and the ground point. The currents pass through the MOSFETs Q1 to Q3 according to size ratios of the MOSFETs Q1 to Q3 to the current-voltage conversion MOSFET Q0. The bit signals B1 to B3 of the control code CC are applied to gate terminals of the switch MOSFETs Q11 to Q13, respectively. The total current varies depending on the number of MOSFETs that are turned on by the bit signals B1 to B3.

In this embodiment, the power supply control IC is provided with an input terminal of a shutdown signal SHDN. The internal constant current source is turned off by the shutdown signal SHDN to put the error amplifier 12, the PWM comparator 13, and the oscillation circuit 14 into the non-operation state. A resistor R0 and a switch MOSFET SW0 are provided in series between the feedback terminal FB and the ground point. In the shutdown, the shutdown signal SHDN is applied to a gate terminal of the switch MOSFET SW0 to turn on the switch MOSFET SW0, thereby discharging the current flowing into the feedback terminal FB. Such a structure prevents internal elements constituting the error amplifier 12 connected to the feedback terminal FB from being broken without using high-voltage elements, which does not need a larger area and a complicated process.

In this embodiment, the resistor R0 and the switch MOSFET SW0 are provided in series between the feedback terminal FB and the ground point. Alternatively, only the switch MOSFET SW0 may be provided without the resistor R0. If such a structure is employed, however, because a drain of the switch MOSFET SW0 is directly connected to the external terminal, it is necessary to use an element which can prevent the breakage due to a static charge.

Figure 4:
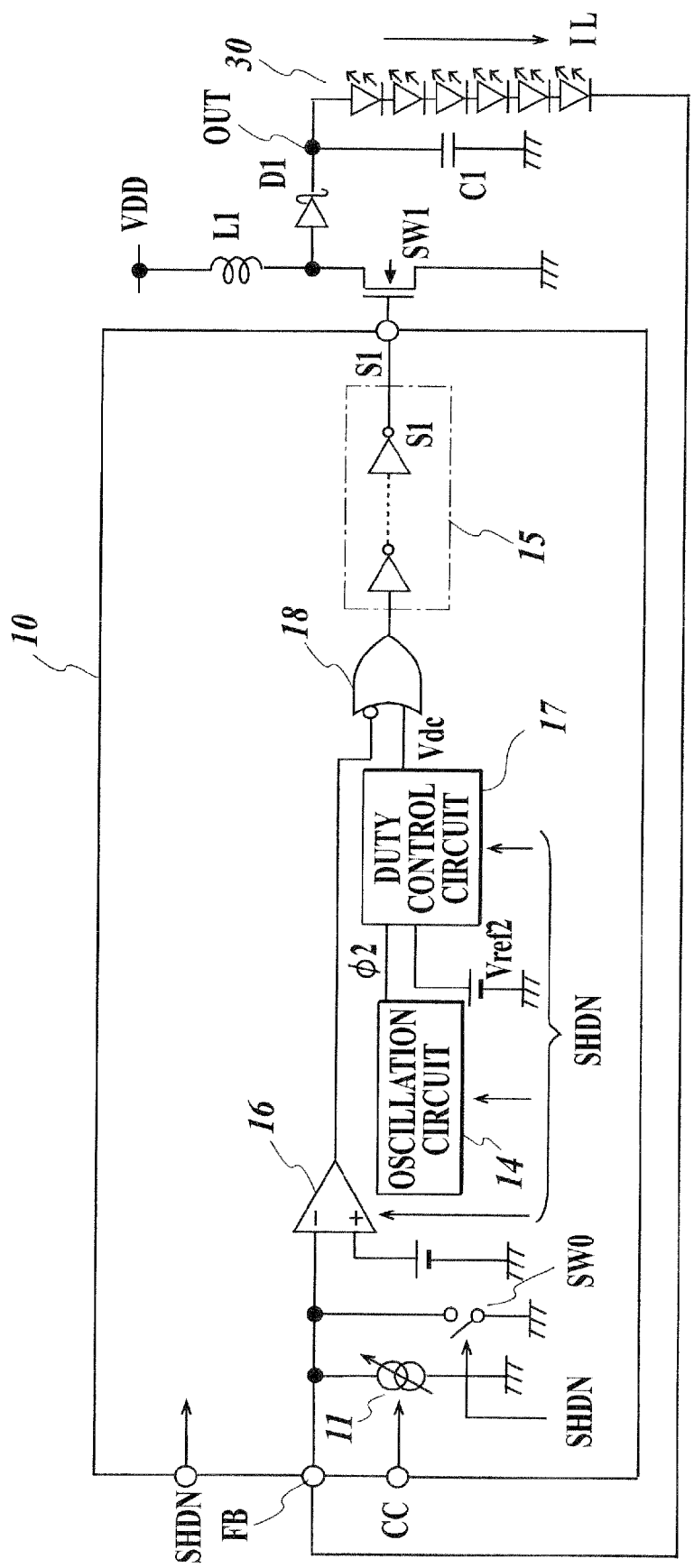
FIG. 4 shows a block diagram of a power supply device for driving an LED according to a second embodiment of the present invention.

FIG. 4 shows a LED driving power supply device according to a second embodiment of the present invention.

The switching control circuit 10 of the second embodiment includes a PFM comparator 16, the oscillation circuit 14, a duty control circuit 17, an OR gate circuit 18, and the drive circuit 15. The PFM comparator 16 is connected to the feedback terminal FB and generates a first pulse signal having a frequency corresponding to the voltage of the feedback terminal FB. The oscillation circuit 14 generates an oscillation signal $\phi2$ having a predetermined frequency. The duty control circuit 17 generates a second pulse signal having a desired pulse width based on the oscillation signal $\phi2$. An inversion signal of the first pulse signal generated by the PFM comparator 16 and the second pulse signal generated by the duty control circuit 17 are fed into the OR gate circuit 18. The drive circuit 15 receives the output of the OR gate circuit 18 and generates a drive signal for driving the switching transistor SW1 on and off. Because the configuration of the variable current source 11 is identical to that of FIG. 3, the detailed illustration and description will be omitted.

As with the first embodiment, the switch MOSFET SW0 is provided between the feedback terminal FB and the ground point in the LED driving power supply device of the second embodiment. In the shut down, the shutdown signal SHDN is applied to a gate terminal of the switch MOSFET SW0 to turn on the switch MOSFET SW0, thereby discharging the current flowing into the feedback terminal FB. Such a structure prevents internal elements constituting the PFM comparator 16 connected to the feedback terminal FB from being broken without using high-voltage elements, which does not need a larger area and a complicated process.

Figure 5:
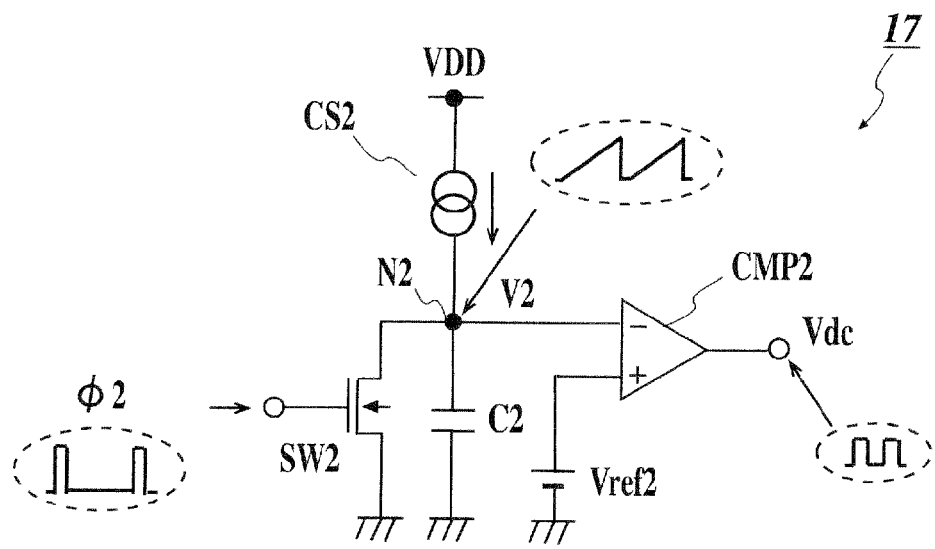
FIG. 5 shows a circuit diagram of an exemplary duty control circuit.
Figure 6:
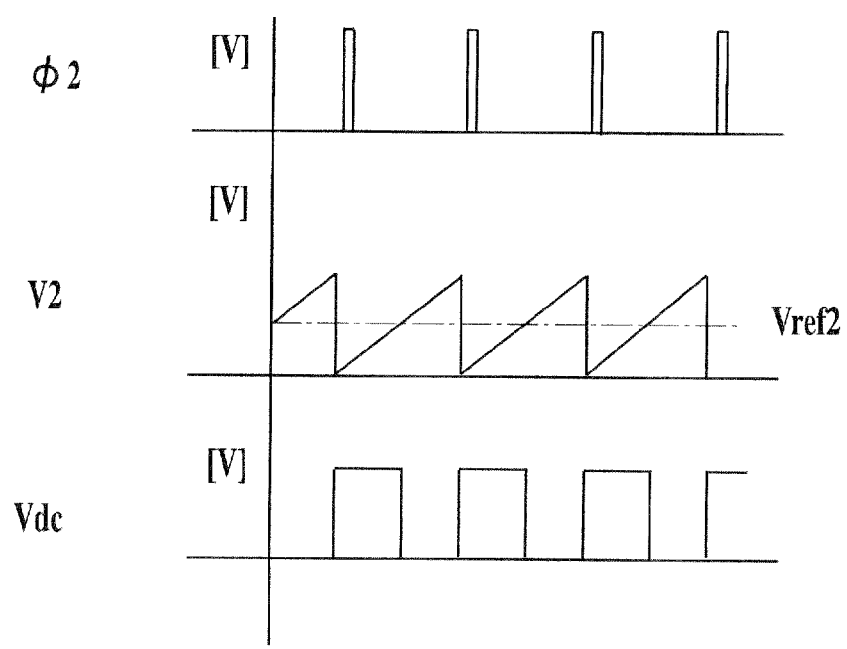
FIG. 6 shows a timing diagram of the duty control circuit of FIG. 5.

FIG. 5 shows a circuit diagram of the exemplary duty control circuit 17. The duty control circuit 17 includes: a constant current source CS2 and a capacitor C2, both of which are connected in series between a power supply voltage terminal VDD and the ground point; a discharging switch MOSFET SW2 connected in parallel to the capacitor C2; and a comparator CMP2 that compares a reference voltage Vref2 and a potential V2 at a connection node N2 between the constant current source CS2 and the capacitor C2. The oscillation signal $\phi2$ supplied from the oscillation circuit 14 is applied to a gate terminal of the switch MOSFET SW2. During a period when the oscillation signal $\phi2$ is at a low level, the switch MOSFET SW2 is off, and the capacitor C2 is charged so that the potential V2 at the connection node N2 is gradually raised by the current of the constant current source CS2. During a period when the oscillation signal $\phi2$ is at a high level, the switch MOSFET SW2 is turned on, and the capacitor C2 is discharged. Accordingly, the potential V2 at the node N2 varies like a sawtooth shape. As shown in FIG. 6, the comparator CMP2 compares the potential of sawtooth waveform with the reference voltage Vref2 to generate a rectangular wave signal Vdc having a desired pulse width according to a gradient of the sawtooth waveform and a level of the reference voltage Vref2. A signal having a frequency of 1 MHz is used as the oscillation signal $\phi2$, for example.

Figure 7:
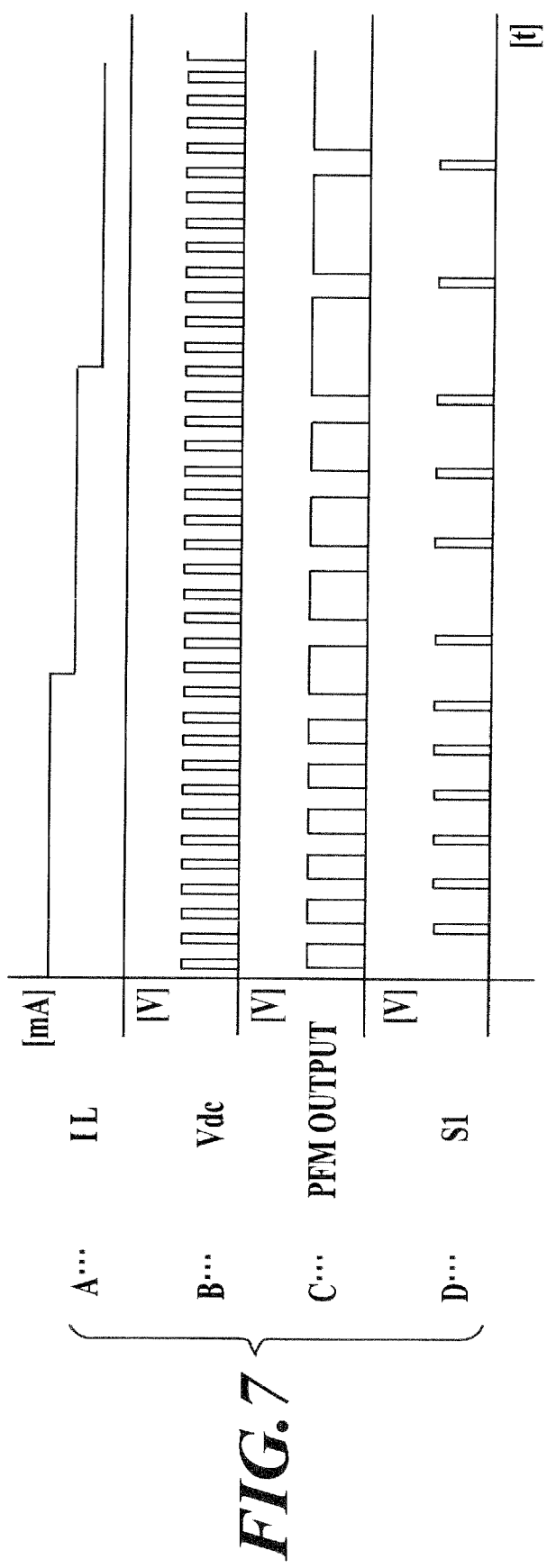
FIG. 7 shows a timing diagram of the power supply device for driving an LED of FIG. 4.

In the LED driving power supply device of the second embodiment, when the current IL of the LED unit is decreased by the control code CC as shown in FIG. 7-(A), a period of the first pulse signal generated by the PFM comparator 16 is gradually lengthened to widen the pulse width (high-level period) as shown in FIG. 7-(C), and an interval of the drive pulse S1 of the switching transistor SW1 is gradually widened as shown in FIG. 7-(D). As a result, the drive current passing through the LED unit is decreased.

Although the exemplary embodiments contemplated by the inventor of carrying out the invention have been shown and described, the invention is not limited to the above-described embodiments shown. For example, in the power supply devices of FIGS. 3 and 4, the oscillation circuit 14 is provided in the power supply control IC. Alternatively, the power supply device may receive the oscillation signal generated outside the chip.

Although MOSFET is used as the switching element SW1 in the above-described embodiments, a bipolar transistor may be employed as the switching element SW1. In the above-described embodiments, the variable current source is connected to the feedback terminal FB. Alternatively, the LED driving power supply device may be provided with a constant current source which is connected to the feedback terminal FB and which is turned on an off in response to a shutdown signal.

In the above-described embodiments, the switching transistor SW1 constituting the switching regulator is connected to the power supply control IC as an external element. Alternatively, the switching transistor SW1 may be provided as an on-chip element of the power supply control IC. In the above-described embodiments, the control code CC as a command regarding the drive current is fed into the power supply control IC from the outside. Alternatively, an analog signal may be used as the drive current command instead of the control code.

Although the present invention is applied to the LED driving power supply device in the above description, the present invention is not limited to the LED driving power supply device. The invention can widely be applied to a boost type power supply device in which the feedback control of the output current is performed.

According to a first aspect of the preferred embodiments of the present invention, there is provided a direct-current power supply device, including: an inductor; a switching element to intermittently supply a current to the inductor; an external terminal to which an output current of an external unit is fed back; a control circuit to generate a pulse signal having a pulse width corresponding to an output voltage of the external terminal, generate a drive signal for driving the switching element in response to the pulse signal, and output the drive signal to the switching element; a variable current source which is connected to the external terminal and which is turned on and off in response to a shutdown signal; and a discharge unit which is connected between the external terminal and a ground point and which is turned on in response to the shutdown signal so that the output current fed back to the external terminal is discharged into the ground point.

According to a second aspect of the preferred embodiments of the present invention, there is provided a power supply device for driving an LED unit by supplying a drive current to the LED unit, the power supply device, including: an inductor; a switching element to intermittently supply a current to the inductor; an output terminal which is connected to the LED unit and through which the drive current is supplied to the LED unit; a rectifying element connected between the inductor and the output terminal; an external terminal to which an output current of the LED unit is fed back; a control signal generating circuit to generate a pulse signal having a pulse width corresponding to an output voltage of the external terminal; a drive circuit to generate a drive signal for driving the switching element in response to the pulse signal generated by the control signal generating circuit and output the drive signal to the switching element; a variable current source which is connected to the external terminal and which is turned on and off in response to a shutdown signal; and a discharge unit which is connected between the external terminal and a ground point and which is turned on in response to the shutdown signal so that the output current of the LED unit is discharged into the ground point.

Because the discharge unit is turned on in response to the shutdown signal so that the output current fed back to the external terminal is discharged into the ground point, these structures prevent internal elements constituting the control circuit connected to the external terminal from being broken without using high-voltage elements, which does riot need a larger area and a complicated process.

Preferably, the variable current source is configured to carry a current in response to an externally supplied current control signal. With this structure, it is possible to change a drive current for driving the LED unit.

Preferably, the variable current source includes: a constant current source which is turned on and off in response to the shutdown signal; a current-voltage conversion transistor connected in series with the constant current source; n first transistors (n is a positive integer) connected to the current-voltage conversion transistor in a current mirror manner; and n second transistors which is connected in series with the respective n first transistors between the external terminal and the ground point and to which n bit signals are applied as the current control signal so that the n second transistors are turned on and off in response to the respective bit signals.

Preferably, the control signal generating circuit includes: an error amplifier circuit that has a first input terminal connected to the external terminal and a second input terminal to which a reference voltage is applied and that outputs an error signal corresponding to a difference between the reference voltage and the output voltage of the external terminal; and a PWM comparator to generate the pulse signal having a pulse width corresponding to the output voltage of the external terminal by comparing a triangle wave having a predetermined frequency with the error signal outputted from the error amplifier circuit, wherein the drive circuit generates the drive signal for driving the switching element on and off based on the pulse signal generated by the PWM comparator.

Preferably, the control signal generating circuit includes: a PFM comparator that has a first input terminal connected to the external terminal and a second input terminal to which a reference voltage is applied and that generates a first pulse signal having a pulse width corresponding to a difference between the reference voltage and the output voltage of the external terminal; a duty control circuit to generate a second pulse signal having a predetermined pulse width based on an oscillation signal having a predetermined frequency; and a logic circuit configured to supply the second pulse signal generated by the duty control circuit to the drive circuit during a period when the first pulse signal generated by the PFM comparator is at a predetermined level, wherein the drive circuit generates the drive signal for driving the switching element based on the second pulse signal supplied by the logic circuit.

According to a third aspect of the preferred embodiments of the present invention, there is provided a semiconductor integrated circuit for controlling power supply, including: an external terminal to which an output current of an external unit is fed back; a control signal generating circuit to generate a pulse signal having a pulse width corresponding to an output voltage of the external terminal; a drive circuit to generate a drive signal for driving a switching element which intermittently supplies a current to an inductor, in response to the pulse signal generated by the control signal generating circuit, and output the drive signal to the switching element; a variable current source which is connected to the external terminal and which is turned on and off in response to a shutdown signal; and a discharge unit which is connected between the external terminal and a ground point and which is turned on in response to the shutdown signal so that the output current of the external unit is discharged into the ground point, wherein the variable current source includes: a constant current source which is turned on and off in response to the shutdown signal; a current-voltage conversion transistor connected in series with the constant current source; n first transistors (n is a positive integer) connected to the current-voltage conversion transistor in a current mirror manner; and n second transistors which is connected in series with the respective n first transistors between the external terminal and the ground point and to which n bit signals are applied as current control signals so that the n second transistors are turned on and off in response to the respective bit signals.

These structures make it possible to realize a power supply device and a semiconductor integrated circuit for controlling power supply, both of which prevent internal elements from being broken because of high voltage feedback. It is also possible to realize a power supply device and a semiconductor integrated circuit for controlling power supply, both of which can change a drive current for driving an external unit in response to an externally-supplied control signal.

The entire disclosure of Japanese Patent Application No. 2008-001352 filed on Jan. 8, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:
1. A direct-current power supply device, comprising:
an inductor;
a switching element to intermittently supply a current to the inductor;
an external terminal to which an output current of an external unit is fed back;
a control circuit to generate a pulse signal having a pulse width corresponding to an output voltage of the external terminal, generate a drive signal for driving the switching element in response to the pulse signal, and output the drive signal to the switching element;
a variable current source which is connected to the external terminal and which is turned on and off in response to a shutdown signal; and
a discharge unit which is connected between the external terminal and a ground point and which is turned on in response to the shutdown signal so that the output current fed back to the external terminal is discharged into the ground point.

2. A power supply device for driving an LED unit by supplying a drive current to the LED unit, the power supply device, comprising:
an inductor;
a switching element to intermittently supply a current to the inductor;
an output terminal which is connected to the LED unit and through which the drive current is supplied to the LED unit;
a rectifying element connected between the inductor and the output terminal;
an external terminal to which an output current of the LED unit is fed back;
a control signal generating circuit to generate a pulse signal having a pulse width corresponding to an output voltage of the external terminal;
a drive circuit to generate a drive signal for driving the switching element in response to the pulse signal generated by the control signal generating circuit and output the drive signal to the switching element;
a variable current source which is connected to the external terminal and which is turned on and off in response to a shutdown signal; and
a discharge unit which is connected between the external terminal and a ground point and which is turned on in response to the shutdown signal so that the output current of the LED unit is discharged into the ground point.

3. The power supply device according to claim 2, wherein the variable current source is configured to carry a current in response to an externally-supplied current control signal, 4. The power supply device according to claim 3, wherein the variable current source comprises:
a constant current source which is turned on and off in response to the shutdown signal;
a current-voltage conversion transistor connected in series with the constant current source;
n first transistors (n is a positive integer) connected to the current-voltage conversion transistor in a current mirror manner; and
n second transistors which are connected in series with the respective n first transistors between the external terminal and the ground point and to which n bit signals are applied as the current control signal so that the n second transistors are turned on and off in response to the respective bit signals.

5. The power supply device according to claim 3, wherein the control signal generating circuit comprises:
an error amplifier circuit that has a first input terminal connected to the external terminal and a second input terminal to which a reference voltage is applied and that outputs an error signal corresponding to a difference between the reference voltage and the output voltage of the external terminal; and
a PWM comparator to generate the pulse signal having a pulse width corresponding to the output voltage of the external terminal by comparing a triangle wave having a predetermined frequency with the error signal outputted from the error amplifier circuit, wherein
the drive circuit generates the drive signal for driving the switching element on and off based on the pulse signal generated by the PWM comparator.

6. The power supply device according to claim 3, wherein the control signal generating circuit comprises:
a PFM comparator that has a first input terminal connected to the external terminal and a second input terminal to which a reference voltage is applied and that generates a first pulse signal having a pulse width corresponding to a difference between the reference voltage and the output voltage of the external terminal;
a duty control circuit to generate a second pulse signal having a predetermined pulse width based on an oscillation signal having a predetermined frequency; and
a logic circuit configured to supply the second pulse signal generated by the duty control circuit to the drive circuit during a period when the first pulse signal generated by the PFM comparator is at a predetermined level, wherein
the drive circuit generates the drive signal for driving the switching element based on the second pulse signal supplied by the logic circuit.

7. A semiconductor integrated circuit for controlling power supply, comprising:
an external terminal to which an output current of an external unit is fed back;
a control signal generating circuit to generate a pulse signal having a pulse width corresponding to an output voltage of the external terminal;
a drive circuit to generate a drive signal for driving a switching element which intermittently supplies a current to an inductor, in response to the pulse signal generated by the control signal generating circuit, and output the drive signal to the switching element;
a variable current source which is connected to the external terminal and which is turned on and off in response to a shutdown signal; and
a discharge unit which is connected between the external terminal and a ground point and which is turned on in response to the shutdown signal so that the output current of the external unit is discharged into the ground point, wherein
the variable current source comprises:
a constant current source which is turned on and off in response to the shutdown signal;
a current voltage conversion transistor connected in series with the constant current source;
n first transistors (n is a positive integer) connected to the current-voltage conversion transistor in a current mirror manner; and
n second transistors which are connected in series with the respective n first transistors between the external terminal and the ground point and to which n bit signals are applied as current control signals so that the n second transistors are turned on and off in response to the respective bit signals.

* * * * *